United States Patent [19]

Kitchens et al.

[11] Patent Number: 4,701,125

[45] Date of Patent: Oct. 20, 1987

[54] THERMAL METHOD FOR DESTRUCTION OF MICROFILM PRODUCTS

[75] Inventors: Judith F. Kitchens, Haymarket; Carl H. Culp, Sr., Vienna; Raymond G. Hyde, Fairfax County, all of Va.; Shirley G. Brownlee, Greenbelt, Md.

[73] Assignee: The United States of America as represented by the Secretary of the Air Force, Washington, D.C.

[21] Appl. No.: 158,418

[22] Filed: Jun. 10, 1980

[51] Int. Cl.$^4$ .............................................. F27B 14/00
[52] U.S. Cl. ...................................... 432/1; 89/1.11; 109/1 R; 109/29; 110/341; 432/13; 432/58
[58] Field of Search ............... 432/58, 13, 1; 109/1 R, 109/29; 89/1.11; 110/341

[56] References Cited

U.S. PATENT DOCUMENTS

| | | | |
|---|---|---|---|
| 3,871,281 | 2/1975 | Leonard | 109/29 |
| 4,226,372 | 10/1980 | Wigand | 241/223 |
| 4,233,024 | 11/1980 | Plass | 432/58 |
| 4,240,363 | 12/1980 | Troy | 110/241 |
| 4,338,098 | 7/1982 | Yamaji | 126/204 |
| 4,355,766 | 10/1982 | Wigand | 241/222 |
| 4,615,490 | 10/1986 | Goldhammer | 241/36 |

*Primary Examiner*—Stephen J. Lechert, Jr.
*Attorney, Agent, or Firm*—William J. O'Brien; Joseph E. Rusz; Donald J. Singer

[57] ABSTRACT

A method for the pyrolytic destruction of microfilm products by utilizing hot silicon oil heated to a temperature of about 250° C. Destruction of the various types of microfilm is accomplished within a five minute time frame.

2 Claims, No Drawings

THERMAL METHOD FOR DESTRUCTION OF MICROFILM PRODUCTS

STATEMENT OF GOVERNMENT INTEREST

The invention described herein may be manufactured and used by or for the Government for governmental purposes without the payment of any royalty thereon.

BACKGROUND OF THE INVENTION

This invention relates to the destruction of microform materials, especially those of a confidential or classified nature. More particularly, this invention concerns itself with a thermal technique for effecting the rapid destruction of microform materials.

The storage, retrieval and distribution of information of a technical nature has become a problem of great importance in light of the many advances made in virtually all areas of science and technology. One system which has found wide acceptance, involves the use of low cost, high quality microforms such as microfilms, microfiche, aperture cards or roll and cartridge film. The use of microforms allows high quality information to be maintained in a minimal amount of space at various locations, thus maximizing the potential use of the information by scientists and technologists. Also, the ready availability of information and its easy retrieval has great military potential, since it materially assists in the mobilization and operation of tactical units especially at the field operational level. However, military type information is often of a confidential nature. Therefore, a method for its rapid destruction must be provided in order to avoid a possibile compromises within a hostile environment.

As a consequence, a number of approaches have been suggested for accomplishing the rapid destruction of microforms. One effective method involves destruction by burning and is referred to as the pyrolytic method. Theoretically, this method should result in the complete destruction of the microform. Unfortunately, pieces of film can sometimes be recovered from the ash. Another method involves mechanical destruction with shredders or pulverizers. This method, however, requires the use of large pieces of equipment that require constant attention and maintenance and are not easily adaptable for use in aircraft or mobile vans due to the problems associated with their size.

The chemical destruction of microforms, such as stripping, is still another method. When utilized however, strict health, safety and environmental guidelines must be adhered to. Also, in the chemical stripping of films, the machines used to accomplish the stripping are large and cumbersome. Furthermore, not all chemical systems are useful for destroying the various types of film supports and emulsions used in fabricating the microform material since the specific chemcial relied upon is often selective in nature and only destroys a specific type of film.

The methods of destruction referred to above and presently in use have not provided a solution to the problem of rapidly destroying the classified microforms used by military planners, especially at the field operational level where time and space allocations are at a minimum. With the present invention, however, a thermal method has been found that provides for the destruction of the various types of microforms in a rapid and efficient manner. Destruction of the microforms is accomplished by using a silicon oil heated to 250° C. to effect the destruction of the film. The silicone oil is preferably placed in a one-drawer field safe although any suitable container could be used. Destruction of the various types of microform products is accomplished effeciently and economically in five minutes or less. All evolved gases are scrubbed before discharge into the environment.

SUMMARY OF THE INVENTION

In accordance with the present invention, it has been found that a thermal or pyrolyticmethod in which silicone oil is heated to 250° C. provides an effective and rapid means for destroying all types of microform products. The silicone oil can be incorporated in any type of destruction box, safe or other container or system used to destroy classified or sensitive documents along with a conventional means for heating the oil. Generally, silicone oil is stored in a suitable tank or storage receptacle. The film to be destroyed is then brought in contact with the silicone oil. For example, the oil can be stored in two tanks positioned on top of a one drawer field safe. The film to be destroyed is placed in a suitable tray which in turn is positioned below and in contact with the two storage tanks. An electrical heater in each storage tank maintains the oil at a predetermined temperature. One suitable method of operation involves activating the system by flipping an external destruct switch which activates two initiators. The initiators in turn propel knife blades through Teflon discs opening the tanks. The heated oil is mixed and distributed over the stored microform products in the tray. Once the oil is distributed over the film, additional heat is supplied by burners located in the bottom of the safe. The burners heat the oil to a temperature of about 250° C. for five minutes to complete the film destruction.

Accordingly, the primary object of this invention is to provide a method for the rapid and efficient destruction of classified microform products.

Another object of this invention is to provide a system for the rapid destruction of classified microforms under military tactical user situations.

A further object of this invention is to provide a system for destroying classified microform products that is capable of handling all types of microforms including silver, diazo, dry diazo, vesicular and computer output microfiche in all common forms such as fiche, rolls and aperature cards in one decomposition cycle.

The above and still further objects of this invention will become more readily apparent upon consideration of the following detailed disclosure thereof.

DESCRIPTION OF THE PREFERRED EMBODIMENT

The present invention encompasses a method for effecting the destruction of microform products, especially classified military documents being utilized during tactical operations. This facile system provides a rapid and efficient means for destroying all types of microfilm products including fiche, rolls, aperture cards, vesicular and computer output microfiches.

In order to destroy microform products in a effective manner, it is important that the composition of these products be known. Several types of microform products are commercially available. These products vary in their physical dimensions, the amount of image reduction, the material from which the base is made, and the composition of the emulsion. Generally, there are three basic physical shapes of microform products. These are roll and cartridge films, fiche and aperture cards.

The roll and cartridge microfilm is available in either a 16 or 35 mm format. Usually, a single row of images is printed on the film; but, side-by-side images are also possible. Fiche are the most commonly used microform products. These materials are 4×6 inch sheets on which images are arranged in rows and columns. Three image reduction ratios are currently in use for fiche. The 24X reduction ratio is the National Micrographics Association standard format. This format results in a 7 row, 14 column fiche containing a total of 98 images. The majority of the microfiche used today are in this format. Fiche made by a Computer Output Microfilm (COM) system generally are a 48X reduction. These fiche have 270 images arranged in 15 rows and 18 columns. The third microfiche format is the ultrafiche. This product contains 3200 images on a single fiche arranged in 40 rows and 80 columns. Aperature cards are computer cards containing a key-punched code and a film square. This film square is usually 35 mm although a 70 mm strip can also be used. Aperature cards are used mainly in the engineering fields to provide machine sorting of film images.

The microfilm product itself generally consists of a light sensitive emulsion layer which is coated on a transparent plastic support base. The type of emulsion and support material employed depends on the use of the product. Two types of support materials are, in general, used for microform products and comprise either a cellulose triacetate or cellulose diacetate support; or a polyethylene terephthalate support. These particular materials are utilized as film bases because of their desirable physical properties of transparency, strength, ridigity and dimensional stability.

The cellulose triacetate support material is usually manufactured by esterification of cellulose. During this process, wood cellulose is treated with acetic anhydride, glacial acetic acid and a catalyst. If the reaction is carried to the theoretical limit, the resulting product would be 44.8% acetylated, however, the material used as a film based is only 43.5% acetylated. The slight reduction in acetyl groups results in a material with more desirable solubility characteristics. In some instances where solvent penetration of the film is desirable, the diacetate film support is used rather than the triacetate form.

In order to make the fiche or roll film base, the cellulose triacetate is cast into sheets of the desired physical dimensions. To accomplish this process, the cellulose triacetate or diacetate polymer is dissolved in solvents to form a dope. The dope solution is spread uniformly over a rotating heated chromium-faced drum. The solvent is allowed to evaporate and a plastic film results. The film sheet is cured and residual solvent removed. Then it is cut to the proper dimensions.

The polyethylene terephthalate support material is produced by ester interchange and polymerization of ethylene glycol and dimethyl terephthalate. Due to the limited solubility of polyethylene terephthalate in solvents, it is made into plastic sheets by melt casting instead of solvent casting. In the melt casting operation, the polymer is extruded through a long narrow slit onto a casting wheel. On the casting wheel, the material is cooled and coated with an adhesive copolymer. This copolymer is typically composed of vinylidene chloride, acrylonitrile and itaconic acid. The sheets are then stretched to orient the polymer and are heat set under tension.

The various properties of film base support materials for microform products are shown in Table I as follows.

TABLE I

| Property | Cellulose triacetate | | | Polyethylene terephthalate | | |
| --- | --- | --- | --- | --- | --- | --- |
| Specific gravity | 1.28 | | | 1.39 | | |
| Refractive index, $N_d$ | 1.48 | | | 1.64 | | |
| Water Absorption, % | 5.5 | | | 0.6 | | |
| Folding endurance (MIT), No | 45 | | | 10,000 | | |
| Tear resistance, g | 50 | | | 150 | | |
| Heat distortion tem., °C. | 150 | | | 175 | | |
| Nominal thickness, mils | 5.2 | 8 | | 2.5 | 4 | 7 |
| | 130 | 200 | | 64 | 100 | 180 |
| Solubility | | | | | | |
| Methanol | W | | | N | | |
| Acetone | W | | | N | | |
| Methylene Chlordie | S | | | N | | |
| Heptane | N | | | N | | |
| Benzene | N | | | N | | |

All physical tests conducted at 70° F., 50% relative humidity
Support thickness for tests: cellulose triacetate 5 mils polyethylene terephthalate 4 mils
S = soluble; W = swells; N = no effect The composition of the light sensitive layer affixed to the film support base depends on the type of image formed on the emulsion. Generally, three type of images are formed. These include the silver image, the diazo image and the vesicular image. Silver image microforms are produced for their high resolution and contrast. The majority of the silver image microforms in use are made from a conventional silver halide gelatin emulsion coated on a cellulose triacetate or diacetate base. The base is coated with an adhesive subcoating consisting of gelatin and cellulose nitrate in a mixture of organic solvents and water. When the subcoating is dry, the cellulose nitrate in the formulation provides good adhesion to the cellulose triacetate base. The gelatin in the subcoating insures good binding of the emulsion layer. The emulsion layer consists of a silver bromide light sensitive agent dispersed in a gelatin matrix. Additional layers of gelatin are coated over the emulsion to help protect it from scratches. An anti-halation layer is often coated on the back of the film. This layer normally contains dyes in a gelatin matrix. These dyes absorb light on film exposure but are decolorized on processing. This type of silver microform is exposed and developed in a manner similar to photographic film. However, due to the ease with which the image can be scratched, silver microforms on cellulose triacetate base are used almost exclusively as copy masters. Diazo and vesicular reproductions for everyday use are made from these masters.

Several types of diazo image products are commercially available. These products differ in the dye used to form the image, the base material and the method used to develop the image. The basic image formation process, however, is the same. This image formation process depends on the reaction of a diazonium salt with a coupler to form an azo dye. To form the image, a diazo film containing the image forming chemicals is placed in direct contact with the film to be copied. The diazo film is then exposed to ultraviolet light through the master film. In the areas where no printing is on the master film, the light reaches the diazo film and decomposes the diazonium salt. In the areas where no light strikes the diazo film, the diazonium salt remains undecomposed. The film is developed by altering its chemical composition to allow reaction of the diazonium salt and coupler to form the azo dyes.

Both cellulose diacetate and polyethylene terephthalate film bases are used for diazo products. With the cellulose triacetate base, the image forming chemicals become part of the film base. To make this type of film, the image forming chemicals are dissolved in solutions which penetrate the film and thus carry the chemicals into the film surface.

The vesicular microforms consist of a light sensitive diazonium salt which is evenly dispersed in a thermoplastic hydrophobic resin and coated on a polyethylene terephthalate base. Three processing stages are used to produce the vesicular film: exposure, developing and fixing. During the exposure process, the vesicular film is placed in contact with the original master. The vesicular film is then irradiated with ultraviolet light through the master. During exposure the diazonium salt is decomposed to form nitrogen gas. This gas is trapped within the resin. The film is developed by quickly heating for 0.5 sec to a temperature that softens the resin. Tiny bubbles are formed by the pressure of the gas. Upon cooling these bubbles become the vesicular image. The fixing procedure involves exposure of the entire film to ultraviolet light to decompose any remaining diazonium salt. The gas formed is allowed to diffuse slowly out of the film leaving a clear area where no original exposure occurred. Thus, the vesicular process is a reversal process with a negative image resulting from copying of a positive master.

In generaly, three techniques have been used for the routine destruction of classified film products such as those described above. These techniques include incineration, mechanical destruction and chemical stripping. Incineration is generally regarded as the method of choice for destroying classified microform products. This method should theoretically result in complete destruction of the film. However, unless conditions are carefully controlled, sizable pieces of film can be obtained from the ash or in the gaseous emissions. In addition, gaseous emissions often do not meet pollution control standards.

Although these incinerators have been shown to provide an acceptable method for the routine destruction of film products if careful controls are maintained, they are not useful for field commands. The usefulness of these incinerators for routine and/or emergency destruction of film products at field commands is limited by their bulkiness; the careful monitoring required to destroy the film and meet acceptable environmental standards; the length of time required to destroy the film; and the long recycle time (24 hours).

Mechanical destruction techniques require the use of shredders and pulverizers. As was found for the incinerators that are available for routine destruction of classified film, the mechanical shredders and pulverizers are large pieces of equipment that require constant attention during operation. Thus, these commercially available types of equipment do not provide a satisfactory solution to the routine and emergency destruction of microforms at tactical command levels.

Several source have developed and built devices for the routine chemical stripping of classified film. In general these devices are designed for the stripping of silver emulsion films. The stripping process generally uses sodium hypochlorite (laundry bleach) or hot sodium hydroxide to remove the silver emulsion from the film, although some proprietary formulations are known. The resultant of these processes is a clear film base which can be made into a marketable product. The sludge contains the silver that was stripped from the film and this silver can be recovered and sold. In general, however, chemical strippers built for routine destruction of classified film products are large machines which require continuous monitoring. Thus, the commercially available equipment would not be useful in tactical command situations.

In attempting to overcome the problems previously encountered in destroying classified microforms during tactical operations, studies were conducted of the emergency thermal destruction systems which utilize pyrotechnics to combust the film. In general, complete combustion of the film in a safe drawer requires about 30 minutes with large quantities of noxious gases being emitted. Also, these previous studies indicated that the cellulose triacetate, cellulose diacetate and polyethylene terephthalate films melt at relatively low temperatures. These studies were performed by placing cut pieces of the film in a muffle furnace for a recorded period of time and observing the results.

Experiments were also conducted with a Perkin Elmer DSC-1B (a differential scanning calorimeter) to determine the melting characteristics of the silver (cellulose triacetate base) and diazo (polyester base) film. This instrument is commonly used to measure heats of combuation, heat capacities, and other thermal properties of materials. It employs a precisely controlled heating chamber which can be heated up to 500° C. at varying rates. This was done to determine the endothermic and exothermic properties of the films. Endotherms are temperatures at which the film absorbs heat, indicative of melting. Exotherms are temperatures at which the film gives off heat, indicating combustion. The silver film exhibited an endotherm at around 165° C. and exotherms at about 300°–360° C. The diazo film showed an endotherm at about 260° C. and exotherms at 265°–470° C. It was believed and to be expected that the low temperature endotherms (165° C. and 260° C.) indicated melting of the image and these temperatures might be all that were necessary for the image destructon. Further tests, however, showed that this was not the case. These tests were conducted by heating pices of film to within 50° C. of the desired temperature at a rate of 80° C./min. From that point on a heating rate of 10° C./min was used so that the temperature of the film did not lag behind the temperature of the chamber. The results are presented in Table I. The image destruction of the silver film did not occur until 362° C. Temperatures greater than 297° C. were required to destroy the diazo image or the polyester based film.

In addition, gaseous emissions were observed at temperatures about 327° C. with the silver film and above 277° C. with the diazo film. The high temperatures required for image destruction, along with the gases evolved, clearly indicate that melting is not a suitable choice for film destruction.

TABLE I

| Type of Film | Temperature (°C.) | Results |
| --- | --- | --- |
| Silver | 177 | Film curls slightly |
| (cellulose-base) | 202 | Film curls |

TABLE I-continued

| Type of Film | Temperature (°C.) | Results |
| --- | --- | --- |
| | 227 | Film curls |
| | 252 | Film curls then relaxes |
| | 277 | Film curls, then turns brown - no image destruction |
| | 302 | Film curls and browns - no image destruction |
| | 327 | Film begins to melt, gases evolved |
| | 352 | Film partially melts, gases evolved, some image destruction |
| | 357 | Film partially melts, gases evolved, nearly complete image destruction |
| | 362 | Film melts, gases evolved, complete image destruction |
| Diazo (polyester-base) | 277 | Film browns, gases evolved, some image destruction |
| | 287 | Film darkens, gases evolved, >50% image destruction |
| | 297 | Film darkens, gases evolved, apparent image destruction but later examination showed some images present |

To overcome the problems encountered with previously known methods, a search was made for a fluid destruct medium which could be poured over the film, easily heated and would effect rapid film destruction with scrubbing of the off-gases and it was found that the use of a silicone fluid provided the best results. These oils have high boiling and flash points, low vapor pressures and toxicity and excellent high temperature stability. A particular silicone fluid found to be effective was dimethylsilioxane commerically available as Dow Corning 200. The properties of this oil are summarized in Table II.

The initial experiments with the oil decomposition of microfilm products were performed by heating 100 ml of oil in a beaker to 250° C. Large pieces of film were immersed in the 250° C. oil. The film was quickly "fried" to a black char with the evolution of only minor quantities of smoke. This technique proved successful because the residual was a black char with no images; the oil scrubbed a significant amount of the gases evolved during the pyrolysis of the film; and the oil is easy to work with, non-toxic and has a high flash point.

The use of the hot silicone oil of this invention effectively destroys microfilm products and thus provides an alternative to the methods utilized heretofore regardless of the type of film or military environment. The optimum thermal technique contemplated by this invention utilizes a silicone oil heated to a temperature of about 250° C. which brings about the destruction of silver, diazo and vesicular types of microfilm products in five minutes or less. The evolved gases resulting from this procedure are scrubbed before discharge into the environment.

The effective utilization of the concept of this invention which employs hot oil to thermally decompose microform products to a black char in five minutes, is accomplished by using a silicone oil, preferably Dow Corning 200 or Dow Corning 550. The temperature of the oil must reach 250° C. to assure complete destruction of the various types of film products. The concept can be incorporated into a class 6 field safe which can be used for both storage and destruction of classified film. For example, the oil is stored in two conventional metal tanks or containers located in the top portion of the safe. Each tank contains an electrical heater which maintains the oil at a temperature of from about 100° to 150° C. The destruction of the film is initiated when an operator lifts a switch guard and flips a destruction switch. This switch initiates the firing sequence for opening the storage containers by propelling knives through Teflon discs located in the bottom of the containers. Simultaneously, the switch shuts off the electric heaters in the containers. The warm oil then flows by gravity through a suitable connector into a suitable tray which contains the film to be destroyed. Gas is then turned on to propane burners located beneath the tray to further heat the oil. As the oil is heated to 250° C., the film is destroyed within 5 minutes. The emitted gases are circulated through a tray exhaust vent into the propane burners where the excess gases are scrubbed.

TABLE II

| Standard Viscosity 25° C. (centistokes) | 200 |
| --- | --- |
| Flash Point, Open Cup | 315° C. |
| Pour Point | −52° C. |
| Specific Gravity at 25° C. | 0.971 |
| Visc. Temp. Coefficient | 0.61 |
| Coefficient of Expansion cc/cc °C. | 0.00096 |
| Refractive Index at 25° C. | 1.4031 |
| Surface Tension at 23° C. (dyne/cm) | 21.0 |
| Thermal Conductivity at 25° C. | 0.00037 |
| Volatility, % at Temp. | 150° C., 0.5% |

From a consideration of the above, it can be seen that the present invention provides for the destruction of all types of film products by pyrolysis in a silicone oil medium heated to a temperature of 250° C. Initial heating of the oil to 210° C. in a test oven did not complete destruction of the silver diazo and vesicular type films tested. The system can be easily incorporated into a one drawer field safe. However, to meet the five minute time limit for film destruction, the oil is preheated to a temperature between 100° to 150° during storage. After dispersion over the film, the oil is heated to 250° C. to accomplish destruction. The major portion of the gases generated by the pyrolysis of the film are scrubbed by the oil. However, excess gases are piped to the heating means used to raise the oil temperature to 250° C. These gases are subsequently scrubbed and burned to carbon dioxide, water, nitric and nitrose oxide. The film residue is a black char containing no readable images.

While the invention has been described with particularity, it should be understood that various alternations and modifications can be made without departing from the spirit of the invention, the scope of which is defined by the appended claims.

What is claimed is:

1. A method for the pyrolytic destruction of microform products which comprises the steps of:
  a. placing said microform products in a suitable container;
  b. placing silicone oil within a storage container positioned adjacent to said microform products;

c. preheating said silicone oil to a temperature of between 100° to 150° C.;
d. rupturing said silicone oil containing storage container to combine said preheated silicone oil with said microform products;
e. further heating the combination of said preheated silicone oil and said microform products to a temperature of about 250° C. for a period of about five minutes to effect the pyrolysis of said microform products.

2. A method in accordance with claim 1 further including the step of heating any evolved gases generated by said pyrolysis thereby preventing their emission to the atmosphere.

* * * * *